United States Patent [19]
Chou

[11] Patent Number: 5,370,412
[45] Date of Patent: Dec. 6, 1994

[54] ERGONOMICALLY SUPERIOR BICYCLE METER ASSEMBLY

[76] Inventor: Ming-Fu Chou, No. 27, Alley 2, Lane 437, Peitun Rd., Taichung, Taiwan, Prov. of China

[21] Appl. No.: 103,923

[22] Filed: Aug. 10, 1993

[51] Int. Cl.$^5$ ............................................. B62J 39/00
[52] U.S. Cl. ..................................................... 280/288.4
[58] Field of Search .......................................... 280/288.4

[56] References Cited

U.S. PATENT DOCUMENTS 5,178,033  1/1993  Kund ............................. 280/288.4

FOREIGN PATENT DOCUMENTS 422503  5/1948  Italy ................................ 280/288.4
190020  7/1937  Switzerland ................... 280/288.4

Primary Examiner—Mitchell J. Hill
Attorney, Agent, or Firm—Merchant, Gould, Smith, Edell, Welter & Schmidt

[57] ABSTRACT

A separate bicycle meter assembly includes a body portion and a keypad portion separately installed on a handle bar of a bicycle with a plurality of electrical wires connected therebetween. The body portion including a meter fixed at a first place on the handle bar, substantially near a middle portion thereof. The keypad portion is fixed at a second place on the handle bar substantially adjacent to the usual gripping position of the biker's hand near a handle grip thereof. With this structure, a biker is allowed to operate the keypad portion without lifting a hand from the handle grip.

13 Claims, 6 Drawing Sheets

ERGONOMICALLY SUPERIOR BICYCLE METER ASSEMBLY

FIELD OF THE INVENTION

This invention relates to an ergonomically superior bicycle meter assembly especially one which has a keypad portion allowing a biker to operate thereon and a body portion containing a screen for visibly showing the speed of the bicycle, both of which are separately installed on the bicycle, thus, the biker can see the body portion and control the keypad easily.

BACKGROUND OF THE INVENTION

A conventional bicycle meter assembly 50 as shown in FIG. 8 is fixed at the middle portion of a handle bar 80. The meter assembly 50 comprises an integrated circuit board therein, an LCD screen 52 and two control buttons 51 formed at the outer surface thereof. When the corresponding buttons 51 are depressed the LCD screen 52 will display data, such as the speed of the bicycle and the time. Since the meter assembly 50 is installed at the middle portion of the handle bar 40, a biker has to move a hand from a handle grip 81 to depress the corresponding buttons 51 in order to see the speed or time etc. This incurs inconvenience and danger to the biker because he has to lift one hand to depress the buttons and therefore has to control the bike with a remaining hand. It is requisite to separate the buttons 51 from the meter assembly 50, thus allowing the biker to depress the buttons without moving a hand from the handle grip 81.

SUMMARY OF THE INVENTION

It is an object of the present invention to provide a bicycle meter assembly which has body portion and keypad portion separatedly installed on a handle bar of a bicycle with electrical wires connected therebetween. The body portion comprising a meter is fixed at a first place of the handle bar substantially near a middle portion thereof. The keypad portion is installed adjacent to the usual gripping position of the biker's hand (right or left) near the handle grip, thereby allowing the biker to operate thereon without moving a hand from the handle grip.

It is another object of the present invention to provide a bicycle meter assembly which has a meter easily taken off and reinstalled on the bicycle.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
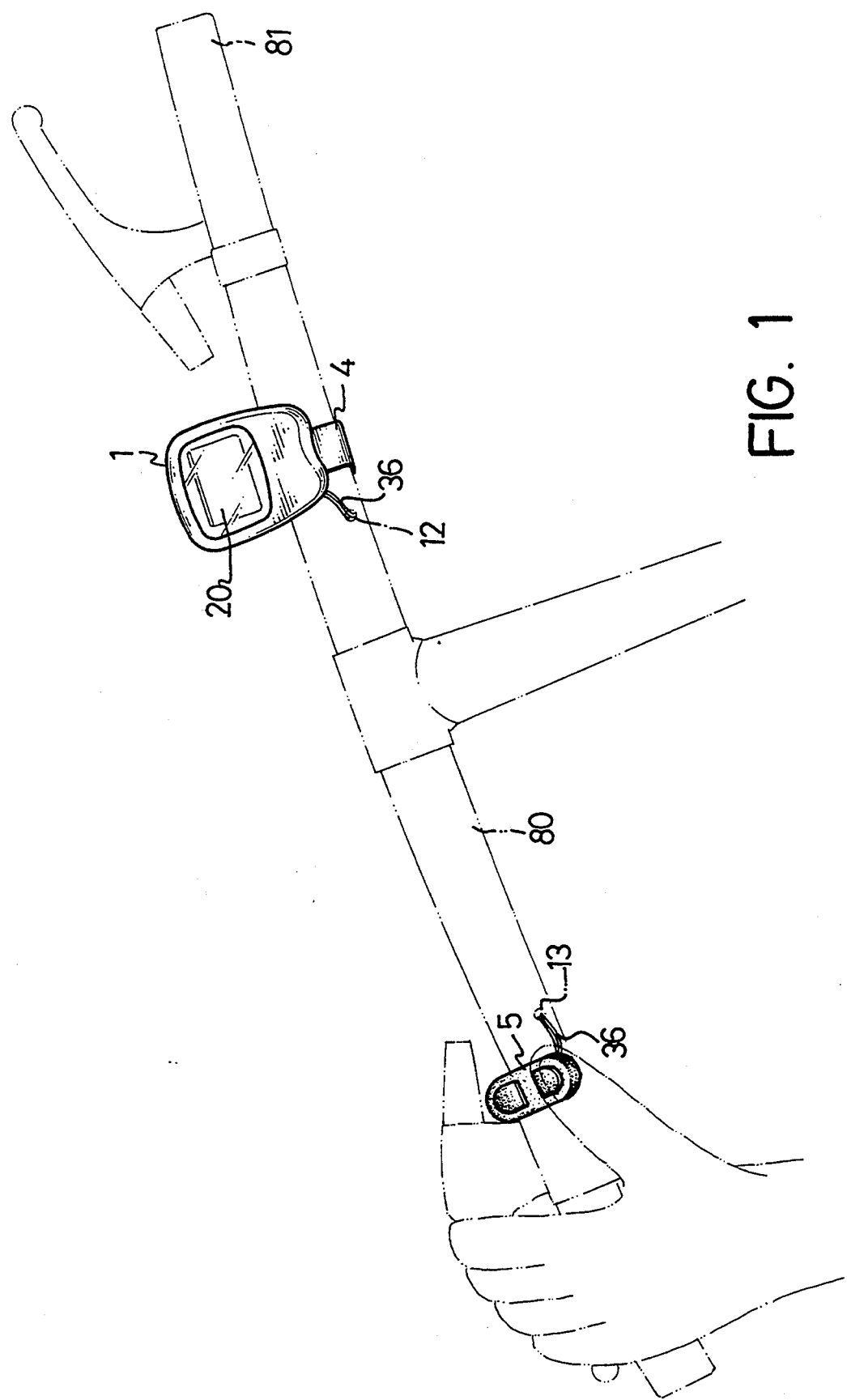
FIG. 1 is a separate bicycle meter assembly including a body portion and a keypad portion installed on a handle bar of a bicycle.

Referring to FIG. 1, a separate bicycle meter assembly comprises a body portion 1 and a keypad portion 5 separately installed on a handle bar 80 of a bicycle with electrical wires 36 connected therebetween. A biker's hand, illustrated with phantom lines, is allowed to hold onto a grip 81 and operate on the keypad 5 simultaneously. The body portion 1 is allowed to be installed at a place substantially at the middle portion of the handle bar 80, not as shown in FIG. 1. The keypad portion 5 is installed adjacent to the usual gripping position of the biker's hand (right or left) near the handle grip, thereby allowing the biker to operate thereon without moving a hand from the handle grip. A first hole 12 is located at a first place of the handle bar 80 near the body portion 1 and a second hole 13 is located at a second place of the handle bar 80 near the keypad portion 5. As is known, the handle bar 80 is a hollow tube therefore the wires 36 can be inserted into the handle bar 80 via the first hole 12 and the second hole 13.

Figure 2:
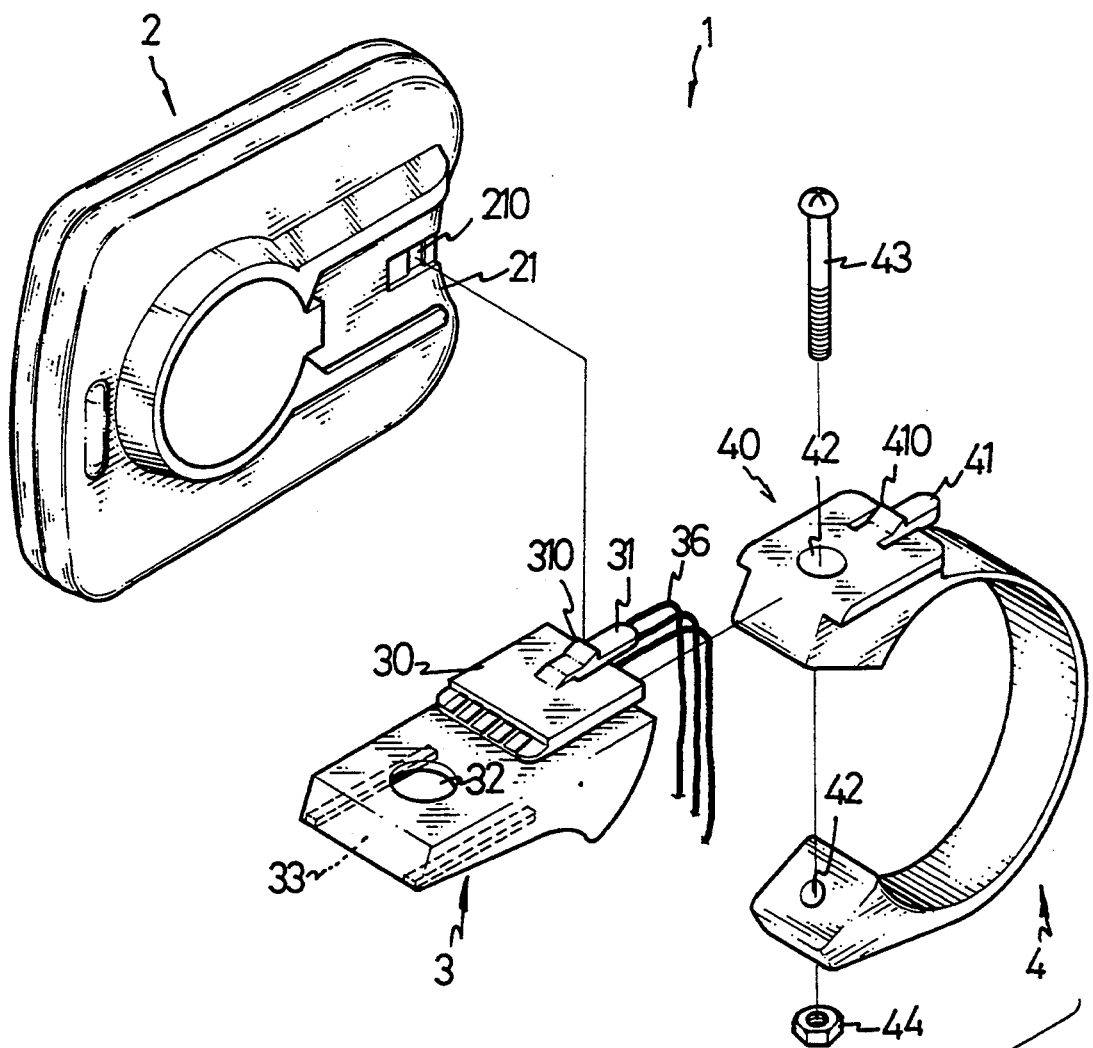
FIG. 2 is an exploded view of the body portion of the meter.

Referring to FIG. 2, the body portion 1 comprises a meter 2, an engaging means 3, and a first fixing means 4. The meter 2 has an LCD screen (hidden from the view) on an upper surface for visibly showing the speed of the bicycle and a first catch receptacle 21 formed at a bottom thereof. The engaging means 3 comprises a first catch 30 on an upper surface thereof for engaging to the first catch receptacle 21 of the meter 2 and a second catch receptacle 33 at a bottom thereof. The first fixing means 4 basically is a flexible belt having a second catch 40 at one end thereof for engaging to the second catch receptacle 33. Two holes 42 are respectively formed at two distal ends of the first fixing means 4 allowing a screw 43 and a nut 44 to firmly secure the fixing means 4 around a middle portion of the handle bar 80. The engaging means 3 also has a hole 32 appropriately located at one end thereof such that when the engaging means 3 is engaged to the fixing means 4, the hole 32 and the holes 42 are in alignment with each other allowing the screw 43 to pass therethrough.

The first catch receptacle 21 of the meter 2 has a recess 210 thereon. A first flexible tongue 31 extends from the first catch 30 having a ratchet tooth 310 thereon for locating in the recess 210 of the first catch receptacle 21 when the meter 2 is secured on the engaging means 3. When the meter 2 is secured to the engaging means 3, the first flexible tongue 31 has a tip portion still protruding beyond the first catch receptacle 21 allowing the user to depress it thus disengaging the ratchet tooth from the recess so that the meter 2 can be slid off the engaging means 3. Therefore, it is very convenient for a user to take off the meter 2 from the bicycle after he has parked the bicycle, preventing someone from stealing the meter 2. A plurality of electrical wires 36 extend from the engaging means 3 and are electrically connected to a circuit portion in the meter 2 when the meter 2 is secured to the engaging means 3.

Figure 6:
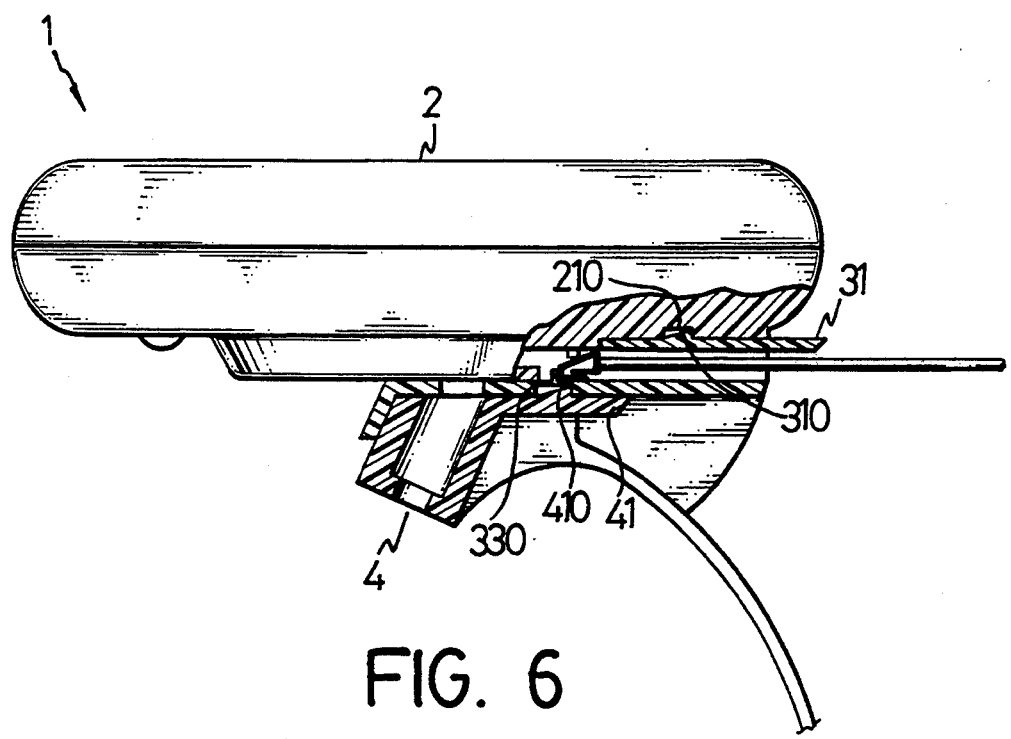
FIG. 6 is an assembled view of FIG. 2 with a lower portion thereof being shown in sectional view.
Figure 8:
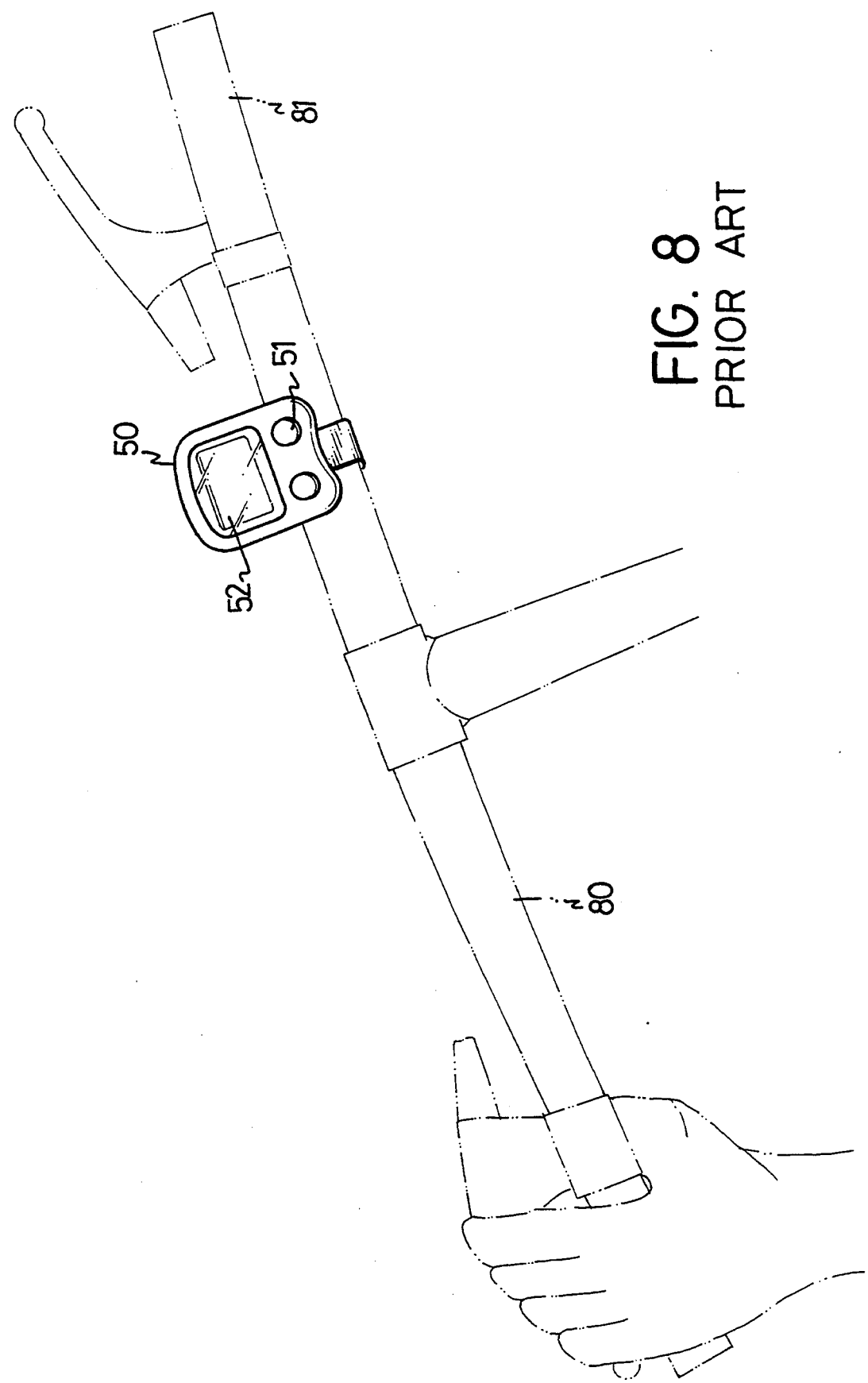
FIG. 8 illustrates a conventional bicycle meter which has a keypad installed thereon.

Referring to FIGS. 2 and 6, the second catch receptacle 33 of the engaging means 3 has a second recess 330 therein. The first fixing means 4 has a second flexible tongue 41 extending from the second catch 40. A second ratchet tooth 410 is formed on the second tongue 41 for locating in the second recess 330 of the second catch receptacle 33 when the engaging means 3 is secured on the fixing means 4. Since the engaging means 3 is firmly secured on the fixing means 4 by the first screw 43 and the second ratchet tooth 410, it is difficult to detach it from the fixing means 4 unless the user removes the screw 43 and releases the engagement between the second ratchet 410 and the second recess 330. When the user wants to release the engagement between the second ratchet 410 and the second recess 330, he merely depresses the second tongue 41 by means of a screw driver or the like, forcing the second ratchet tooth 410 to exit from the second recess 330, and in the mean time the engaging means 3 is slid off the fixing means 4.

Figure 3:
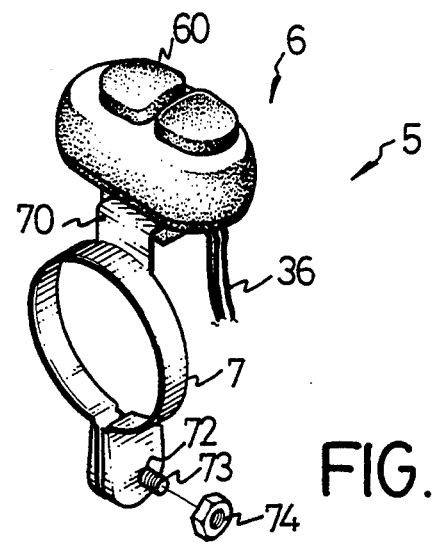
FIG. 3 is a perspective view of the keypad portion of the meter assembly.
Figure 4:
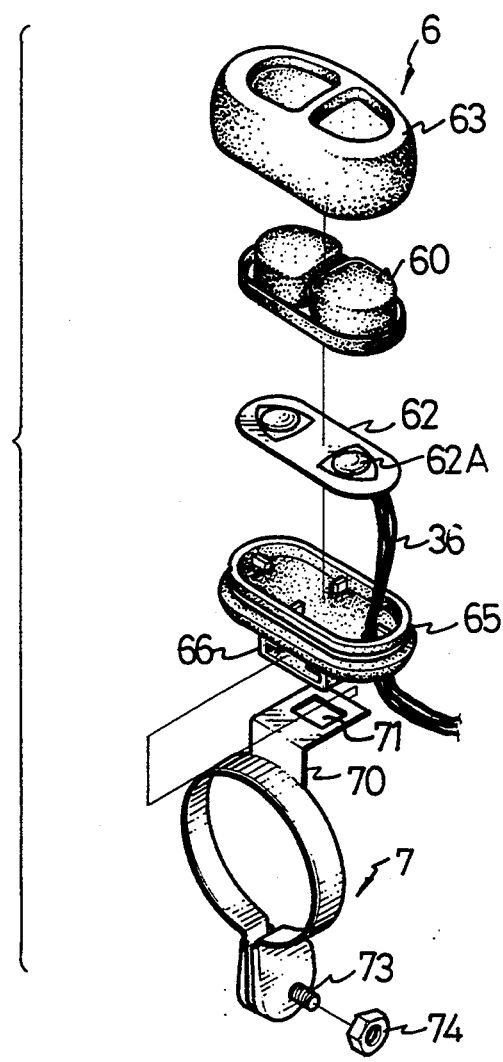
FIG. 4 is an exploded view of the keypad portion of the meter assembly.
Figure 7:
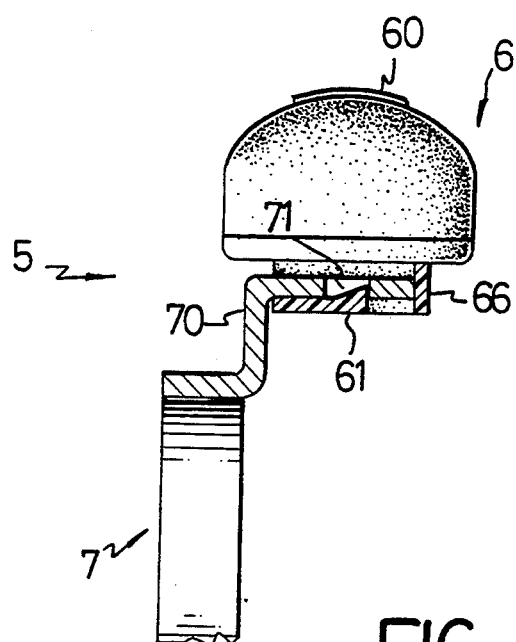
FIG. 7 is partially sectional view of FIG. 3.

Referring to FIGS. 3 and 4, the keypad portion 5 comprises a keypad 6 and a second fixing means 7. The keypad 6 has two button switches 60 at an upper surface thereof and a third catch receptacle 66 at a lower surface thereof. The two button switches 60 are electrically connected to a circuit portion of the meter 2 via the electrical wires 36, such that the biker can easily operate the button switches 60 to control the visible display on the meter 2 when he is biking. The circuit portion of the meter 2 will be discussed later. The second fixing means 7 basically is a C-ring having two holes 72 each at a distal end thereof. A second screw 73 and a second nut 74 cooperate to secure the second fixing means 7 around the handle bar 80. A third catch 70 extends from a peripheral portion of the C-ring of the second fixing means 7 for inserting into the third catch receptacle 66 and fixing thereto. Basically the third catch 70 is an L-shaped plate radially and outwardly protruding from the C-ring 7. Further referring to FIG. 7, the third catch receptacle 66 has a flexible slab 61 constituting a bottom wall thereof. The third catch 70 has an aperature 71 formed at the horizontal portion thereof for engaging with the edge of the slab 61 when the horizontal portion of the catch 70 is inserted into the third catch receptacle 66. When the user wants to release the engagement between the key pad 6 and the second fixing means 7, he lifts slightly the slab 61 by means of a small screw driver or the like and pulls the horizontal portion of the third catch 70 outward from the third catch receptacle 66 of the keypad 6.

Particularly referring to FIG. 4, the keypad 6 comprises an upper housing 63, a switch board 62, a switch cap 60, and a lower housing 65. The switch board 62 is positioned in the lower housing 65 with the switch cap 60 mounted thereon. The upper housing 63 is secured to the lower housing 65 and allows the two cap portions of the switch cap 60 to protrude therethrough. Two flexible reeds 62A are positioned on the switch board 62 and enclosed in the switch cap 60. The electrical wires 36 are electrically connected between the switch board 62 and the circuit portion of the meter 2.

Figure 5:
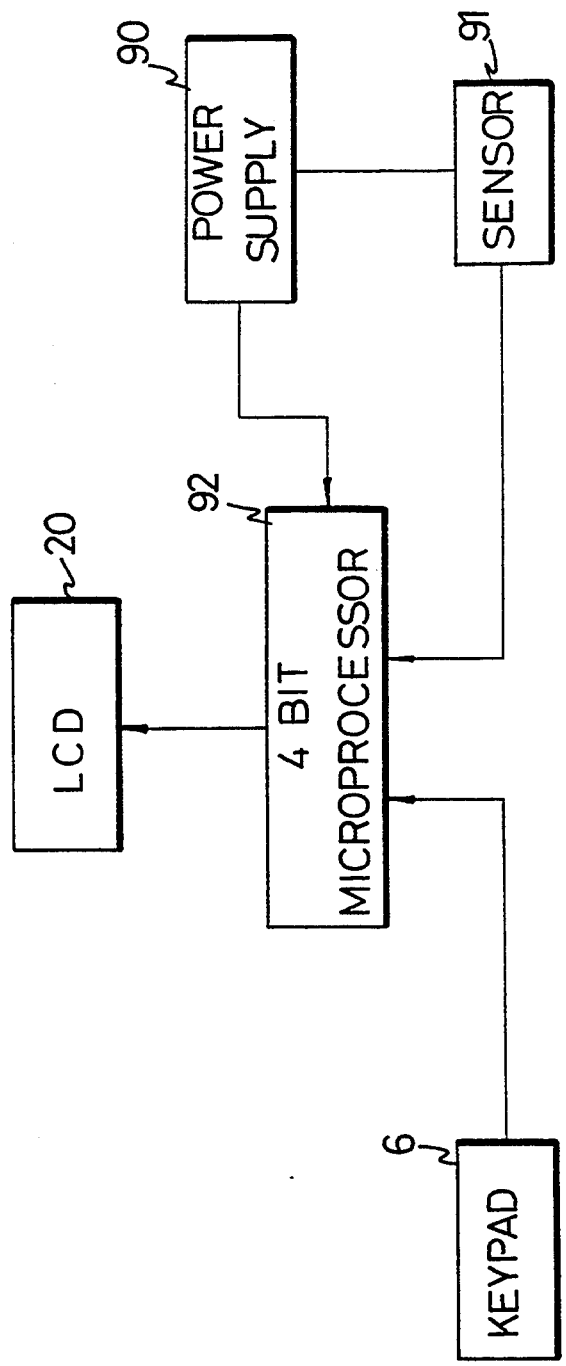
FIG. 5 illustrates a conventional circuit block diagram used to support the function of the bicycle meter.

Referring to FIG. 5, the circuit portion of the meter 2 is illustrated with a circuit block diagram. The circuit comprises a sensor 91 for sensing the speed of the bicycle and generating a speed representing signal, a 4-bit microprocessor 92 electrically connected to the sensor 91 for receiving the speed representing signal and generating a corresponding speed displaying signal to a display unit 20 connected thereto. The display unit 20 is the LCD screen as mentioned before. The keypad 6 as mentioned is also electrically connected to the microprocessor 92 via the wires 36 for controlling the display modes of the meter. A power supply 90 is used to provide the requisite power for the whole circuit as is well known. The circuit herein is merely for reference and is not in the scope of the present invention.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A separate bicycle meter assembly comprising a body portion (1) and a keypad portion (5) separately installed on a handle bar (80) of a bicycle with electrical wires (36) connected therebetween, said body portion comprising a meter (2) being fixed at a first place of said handle bar (80) substantially at a middle portion thereof, said keypad portion (5) being fixed at a second place of said handle bar (80) substantially adjacent to the usual gripping position of the biker's hand near a handle grip (81) thereof such that a biker operates said keypad portion (5) without lifting a hand.

2. The separate bicycle meter assembly as claimed in claim 1, wherein said body portion (1) further comprises a first fixing means (4) for fixing said meter (2) on said first place of said handle bar (80), and an engaging means (3) for engaging said meter (2) to said fixing means (4).

3. The separate bicycle meter assembly as claimed in claim 2, wherein said meter (2) has an LCD screen (20) on an upper surface thereof for visibly showing the speed of the bicycle and a first catch receptacle (21) formed at a bottom thereof.

4. The separate bicycle meter assembly as claimed in claim 3, wherein said engaging means (3) comprises a first catch (30) at an upper surface thereof for engaging to said first catch receptacle (21) of said meter (2) and a second catch receptacle (33) at a bottom thereof.

5. The separate bicycle meter assembly as claimed in claim 4, wherein said first fixing means (4) is a flexible belt having a second catch (40) at one end thereof for engaging to said second catch receptacle (33).

6. The separate bicycle meter assembly as claimed in claim 5, wherein said first fixing means (4) has two holes (42) each formed in one of two distal ends thereof allowing a screw (43) to penetrate therethrough and secured with a nut (44) when said fixing means (4) is operated to enclose the middle portion of said handle bar (80).

7. The separate bicycle meter assembly as claimed in claim 6, wherein said first catch receptacle (21) of said meter (2) has a recess (210) therein, and said first catch (30) has a first flexible tongue (31) extending therefrom having a ratchet tooth (310) thereon for securing to said recess (210) of said first catch receptacle (21) when said meter (2) is fixed on said engaging means (3).

8. The separate bicycle meter assembly as claimed in claim 7, wherein said first flexible tongue (31) has a tip portion protruding beyond said first catch receptacle (21) when the meter (2) is secured to said engaging means (3), thus allowing the biker to depress said protruded tip portion and pull off said meter (2) from said engaging means (3).

9. The separate bicycle meter assembly as claimed in claim 8, wherein said second catch receptacle (33) of said engaging means (3) has a second recess (330) therein, and said first fixing means (4) has a second tongue (41) extending from said second catch (40) having a second ratchet tooth (410) formed thereon allowing to secure to said second recess (330) of said second catch receptacle (33) when said engaging means (3) is fixed on said fixing means (4).

10. The separate bicycle meter assembly as claimed in claim 1, wherein said keypad portion (5) comprises a keypad (6) and a second fixing means (7) firmly fixed on said second place of said handle bar (80), said keypad (6) being mounted on said second fixing means (7).

11. The separate bicycle meter assembly as claimed in claim 10, wherein said keypad (6) comprises an upper housing (63), a switch board (62), a switch cap (60), and a lower housing (65), said switch board (62) being positioned in said lower housing (65) with said switch cap (60) mounted thereon, said upper housing (63) being secured to said lower housing (65) allowing a top portion of said switch cap (60) to protrude therethrough, two flexible reeds (62A) being positioned on said switch board (62) and enclosed in said switch cap (60).

12. The separate bicycle meter assembly as claimed in claim 1, wherein said second fixing means (7) is a C-ring structure having two holes (72) each at one of two distal ends thereof allowing a second screw (73) to be inserted therethrough and secured to a second nut (74), thereby fixing said second fixing means (7) on said handle bar (80).

13. The separate bicycle meter assembly as claimed in claim 12, wherein said second fixing means (7) has a third catch (70) integrally extending from a periphery portion thereof and said keypad (6) has a third catch receptacle (61) at a lower surface thereof for firmly receiving said third catch (70) therein thereby fixing said keypad (6) to said second fixing means (7).

* * * * *